(No Model.) 2 Sheets—Sheet 1.

A. N. WOODARD.
POTATO DIGGER.

No. 424,242. Patented Mar. 25, 1890.

Witnesses:
P. M. Hulbert
Geo. A. Gregg

Inventor:
Alvin N. Woodard
By Thos. S. Sprague & Son
Atty.

(No Model.) 2 Sheets—Sheet 2.
A. N. WOODARD.
POTATO DIGGER.
No. 424,242. Patented Mar. 25, 1890.
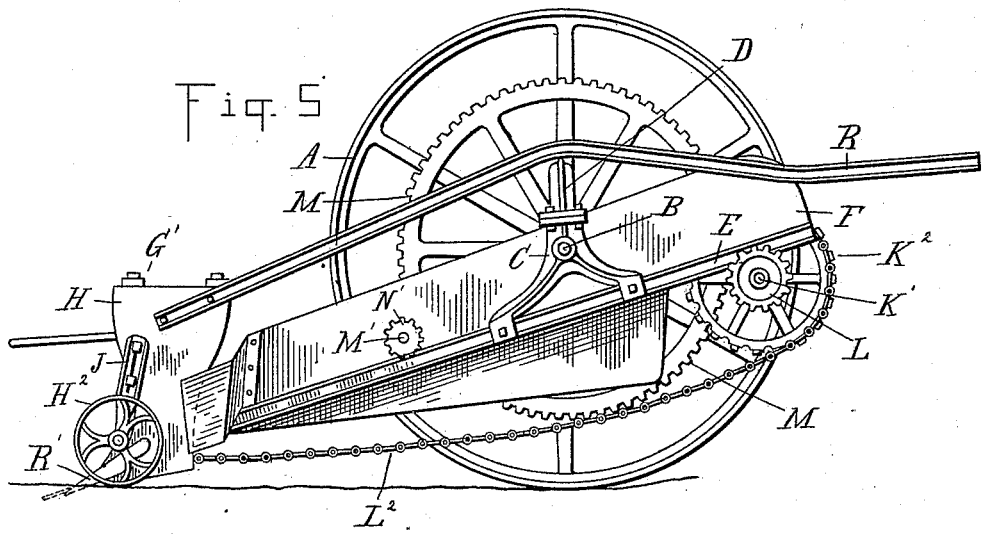
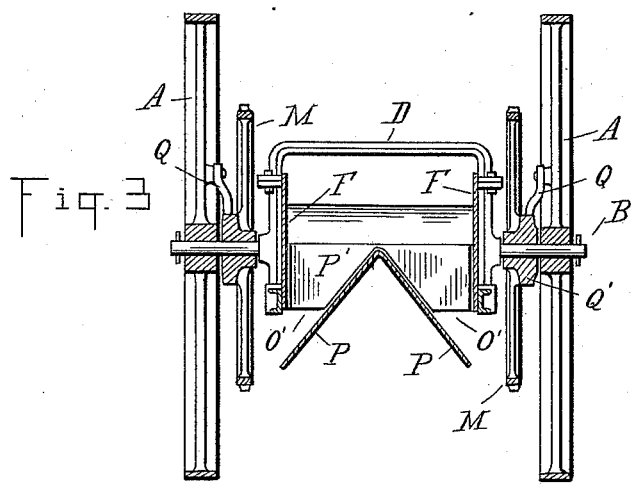
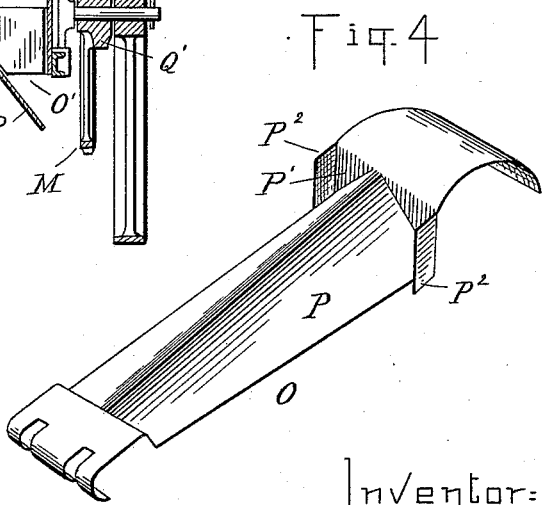
Witnesses:
A. M. Hulbert
Geo. A. Gregg
Inventor:
Alvin N. Woodard
By Thos. S. Sprague & Son
Att'y

UNITED STATES PATENT OFFICE.

ALVIN N. WOODARD, OF JAMESTOWN, NEW YORK.

POTATO-DIGGER.

SPECIFICATION forming part of Letters Patent No. 424,242, dated March 25, 1890.

Application filed June 17, 1889. Serial No. 314,539. (No model.)

*To all whom it may concern:*

Be it known that I, ALVIN N. WOODARD, a citizen of the United States, residing at Jamestown, in the county of Chautauqua and State of New York, have invented certain new and useful Improvements in Potato-Diggers, of which the following is a specification, reference being had therein to the accompanying drawings.

This invention relates to new and useful improvements in potato-diggers; and the invention is intended to form an improvement upon Letters Patent No. 390,426, granted to me October 2, 1888; and it consists in the peculiar construction of an apron or divider located below the carrier; further, in the peculiar construction of the handle or guide-arms for raising or lowering the plow in and out of the ground as the operator desires, and, further, in the peculiar construction, arrangement, and combination of the various parts, all as more fully hereinafter described.

Figure 1:
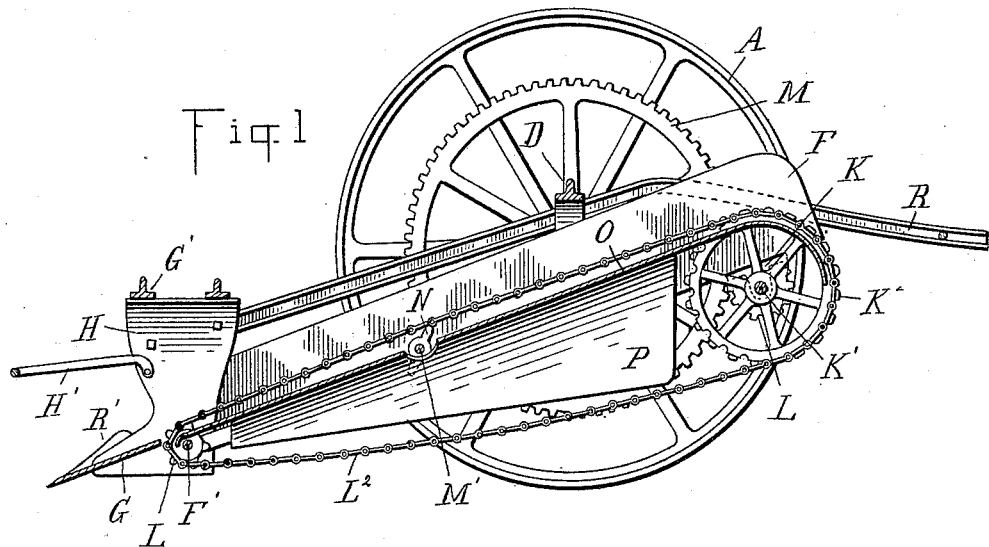
Figure 2:
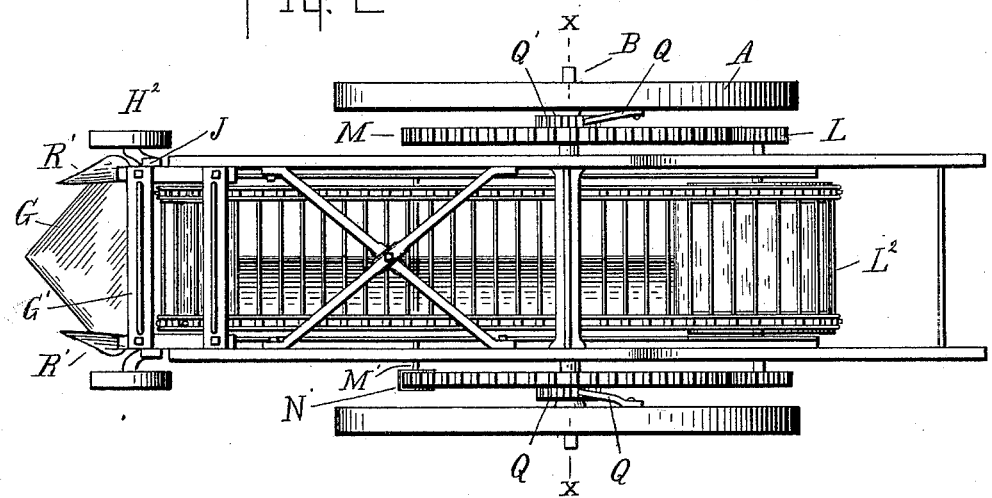

In the drawings which accompany this specification, Figure 1 is a central longitudinal section through my improved potato-digger. Fig. 2 is a plan thereof. Fig. 3 is a cross-section thereof on line $x$ $x$ in Fig. 2. Fig. 4 is a perspective view of the apron detached, and Fig. 5 is a side elevation of the digger with one of the ground-wheels detached.

A are the ground-wheels, supported upon the stub-axles B, secured in the frame C, which has the arch D connecting the two sides rigidly together. This frame is bifurcated below the axles, and to the end of the bifurcations is secured the side bars E, preferably of angle or channel iron, to which are secured the sides F. At the lower end of the frame is pivotally secured the plow G on the shaft F'. This plow is of the usual type of scoop-plows. To the sides of this plow are attached the extensions H, united at the top by the cross-bars G'.

H' is the draft-iron, attached to the forward end of the sides of the plow, and H'' are adjustable ground-wheels journaled in the brackets J, secured to the side pieces H.

At the upper end of the frame are the side brackets K, in which is journaled the shaft K', on which are secured the sprocket-wheels K'' between the sides, and also the pinions L, which mesh with the gear-wheels M on the shaft B.

Upon the shaft F' are journaled the sprocket-wheels L'.

L'' is an endless carrier consisting of suitable sprocket-chains connected by rods and passing over the wheels L' and K'' at the end of the frame.

M' is a shaft journaled in the side pieces E and provided with suitable shaker-arms N. This shaft carries the pinion N', meshing with one of the gear-wheels M. Below the carrier is secured the apron O, which at its upper and lower ends has planed surfaces below the carrier, while in its middle portion it has a double-inclined surface P, extending down below the sides F, having apertures O' below the sides for the exit of the earth. A shoulder P' is formed at or near the upper end of the incline P and side wings P'', by the latter of which the apron is attached to the sides F.

R is a handle secured to the top of the side pieces H of the plow and resting at or near the middle upon the arch C, having a suitable rearward extension to allow of the operator walking behind to control up or down the motion of the plow, it being evident that as the operator raises the handles the nose of the plow will be depressed, and by lowering the handles the plow will be run out of the ground.

Suitable side plows R' are secured to the side of the plow and arranged to cut a furrow on both sides of the scoop-plow to define the width of furrow.

The ground-wheels A and the gear-wheels M are both loosely journaled upon the shafts B, connection being made between the two by means of a suitable ratchet Q, secured to the wheels A and engaging in the teeth of the ratchet-wheels Q', rigidly secured to the gear-wheels M, all so arranged that when the machine is moving forward the carrier will be actuated so that the wheel may move backward without operating the carrier mechanism.

In practice, the parts being constructed and arranged substantially as described, they are intended to operate as follows: The earth is sifted through the carrier upon the double incline P, and by the pitch of the sides of this incline it is rapidly discharged through the aperture O' at either side of the machine. Should any roots or other lumps of material be carried up by the carrier to the shoulder P the abrupt edges thereof will tend to cut it off and drop it behind the incline P. The potatoes will be thus sifted from the earth and carried by the carrier up over the rear of the machine, where they will be dropped upon the ground. By dropping the earth through the aperture O' at the sides of the machine it falls in the space between the rows of potatoes, and as the potatoes are dropped by the carrier at the rear of the machine they are in a row by themselves and are entirely free from any of the dirt. The tops have a free and unobstructed opening between the sides of the machine, and no hold is provided upon which they can catch to act to clog the operation of the machine.

By providing the side plows R' and defining the width of the furrow just a sufficient amount of earth is taken up to be easily distributed over the carrier, and thus allow the dirt to sift evenly at all times through the carrier.

The ridge of the double incline serves, when the machine is heavily loaded, as a rest for the carrier, so that it is not possible to unduly strain the same.

What I claim as my invention is—

1. A potato-digger consisting of the arch-shaped frame, the stub-axles supported thereon, the ground-wheels on said axles, the side rails connected to the frame, the sides connected to said rails, the plow pivoted to the lower end of the frame, the shaft at the lower end of the frame carrying the sprocket-wheels, the gear-wheel on the stub-axle, the gear-wheels operated thereby, the endless carrier, the apron arranged below the carrier, having the inclines and the shoulder, all arranged and operating substantially as described.

2. A potato-digger consisting of the ground-wheels, the stub-axles supporting the same, the frame, the gear-wheels on the stub-axle, the sprocket-wheels at the upper and lower ends of the frame, the endless carrier passing around said sprocket-wheels, the inclined apron supported in the frame and arranged below the carrier, the plow pivoted to the lower ends of the frame, and the handles for raising and lowering the plow, substantially as described.

3. In a potato-digger, the arch-shaped frame having the bifurcated ends, the side rails fitting in said ends, the sides secured to said rails, the plow pivoted to the lower end of the frame, the endless carrier, the inclined apron having the shoulder, and the handles for raising and lowering the plow, substantially as described.

In testimony whereof I affix my signature, in presence of two witnesses, this 25th day of February, 1889.

ALVIN N. WOODARD.

Witnesses:
   J. PAUL MAYER,
   A. B. EATON.